(12) United States Patent
Sauerwald et al.

(10) Patent No.: US 12,294,655 B2
(45) Date of Patent: *May 6, 2025

(54) METHOD OF USING ONE DEVICE TO UNLOCK ANOTHER DEVICE

(71) Applicant: Apple Inc., Cupertino, CA (US)

(72) Inventors: Conrad Sauerwald, Mountain View, CA (US); Alexander Ledwith, Santa Cruz, CA (US); John Iarocci, Los Gatos, CA (US); Marc J. Krochmal, Santa Clara, CA (US); Wade Benson, Sunnyvale, CA (US); Gregory Novick, San Francisco, CA (US); Noah Witherspoon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,352

(22) Filed: Nov. 7, 2022

(65) Prior Publication Data

US 2023/0231718 A1 Jul. 20, 2023

Related U.S. Application Data

(63) Continuation of application No. 14/810,395, filed on Jul. 27, 2015, now abandoned.

(Continued)

(51) Int. Cl.
*H04L 9/32* (2006.01)
*G06F 21/32* (2013.01)
(Continued)

(52) U.S. Cl.
CPC ............ *H04L 9/3234* (2013.01); *G06F 21/32* (2013.01); *G06F 21/44* (2013.01); *H04L 9/0822* (2013.01);
(Continued)

(58) Field of Classification Search
CPC ... H04L 9/3234; H04L 9/0822; H04L 9/0825; H04L 9/0838; H04L 9/0866;
(Continued)

(56) References Cited

U.S. PATENT DOCUMENTS 5,483,261 A    1/1996   Yasutake
5,488,204 A    1/1996   Mead et al.
(Continued)

FOREIGN PATENT DOCUMENTS

CN     1669265 A     9/2005
CN   101023622 A     8/2007
(Continued)

OTHER PUBLICATIONS

Final Office Action received for U.S. Appl. No. 14/810,395, mailed on Feb. 23, 2021, 21 pages.
(Continued)

*Primary Examiner* — Ashokkumar B Patel
*Assistant Examiner* — Forrest L Carey
(74) *Attorney, Agent, or Firm* — Kubota & Basol LLP

(57) ABSTRACT

A method of unlocking a second device using a first device is disclosed. The method can include: the first device pairing with the second device; establishing a trusted relationship with the second device; authenticating the first device using a device key; receiving a secret key from the second device; receiving a user input from an input/output device; and transmitting the received secret key to the second device to unlock the second device in response to receiving the user input, wherein establishing a trusted relationship with the second device comprises using a key generated from a hardware key associated with the first device to authenticate the device key.

17 Claims, 9 Drawing Sheets

Related U.S. Application Data

(60) Provisional application No. 62/044,907, filed on Sep. 2, 2014.

(51) Int. Cl.
| | | |
|---|---|---|
| *G06F 21/44* | (2013.01) | |
| *H04L 9/08* | (2006.01) | |
| *H04W 4/80* | (2018.01) | |
| *H04W 12/08* | (2021.01) | |
| *H04W 12/50* | (2021.01) | |

(52) U.S. Cl.
CPC .......... *H04L 9/0825* (2013.01); *H04L 9/0838* (2013.01); *H04L 9/0866* (2013.01); *H04L 9/3226* (2013.01); *H04L 9/3271* (2013.01); *H04W 12/08* (2013.01); *H04W 12/50* (2021.01); *G06F 2221/2147* (2013.01); *H04L 2209/24* (2013.01); *H04W 4/80* (2018.02)

(58) Field of Classification Search
CPC ..... H04L 9/3226; H04L 9/3271; H04L 12/08; H04L 2209/24; H04W 12/50; H04W 4/80; G06F 21/32; G06F 21/44; G06F 2221/2147
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,044,154 A | 3/2000 | Kelly | |
| 6,061,454 A | 5/2000 | Malik et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,539,479 B1 | 3/2003 | Wu | |
| 6,690,387 B2 | 2/2004 | Zimmerman et al. | |
| 7,015,894 B2 | 3/2006 | Morohoshi | |
| 7,111,165 B2 | 9/2006 | Lidén et al. | |
| 7,184,064 B2 | 2/2007 | Zimmerman et al. | |
| 7,663,607 B2 | 2/2010 | Hotelling et al. | |
| 8,464,061 B2 | 6/2013 | Bradley | |
| 8,479,122 B2 | 7/2013 | Hotelling et al. | |
| 8,700,899 B1 | 4/2014 | Juels | |
| 2003/0108205 A1 | 6/2003 | Joyner et al. | |
| 2006/0197753 A1 | 9/2006 | Hotelling | |
| 2009/0006852 A1 | 1/2009 | Qiu et al. | |
| 2009/0136035 A1 | 5/2009 | Lee | |
| 2010/0023776 A1 | 1/2010 | Fedronic et al. | |
| 2010/0058450 A1 | 3/2010 | Fein et al. | |
| 2010/0241857 A1 | 9/2010 | Okude et al. | |
| 2011/0215921 A1 | 9/2011 | Ben et al. | |
| 2011/0305337 A1 | 12/2011 | Devol et al. | |
| 2012/0015629 A1 | 1/2012 | Olsen et al. | |
| 2012/0072736 A1 | 3/2012 | Kudoh et al. | |
| 2012/0114120 A1 | 5/2012 | Kambayashi et al. | |
| 2012/0124373 A1 | 5/2012 | Dangoor et al. | |
| 2012/0189134 A1 | 7/2012 | Wang et al. | |
| 2013/0268766 A1* | 10/2013 | Schrecker ............... G06F 21/34 713/185 | |
| 2014/0085048 A1 | 3/2014 | Hadizad | |
| 2014/0120905 A1* | 5/2014 | Kim ......................... H04W 4/80 455/426.1 | |
| 2014/0139315 A1 | 5/2014 | Keranen et al. | |
| 2014/0149746 A1 | 5/2014 | Yau | |
| 2014/0155031 A1 | 6/2014 | Lee et al. | |
| 2014/0208112 A1 | 7/2014 | Mcdonald et al. | |
| 2014/0220897 A1 | 8/2014 | Wan | |
| 2014/0282877 A1 | 9/2014 | Mahaffey et al. | |
| 2014/0310515 A1 | 10/2014 | Kim et al. | |
| 2014/0337234 A1* | 11/2014 | Tang .................. G06Q 20/3278 705/71 | |
| 2015/0007347 A1 | 1/2015 | Rajakarunanayake et al. | |
| 2015/0019442 A1* | 1/2015 | Hird .................... H04W 12/041 726/30 | |
| 2015/0207795 A1 | 7/2015 | Wentz et al. | |
| 2015/0229619 A1 | 8/2015 | Costa et al. | |
| 2015/0296074 A1 | 10/2015 | Shah et al. | |
| 2016/0023414 A1 | 1/2016 | Sasaki et al. | |
| 2016/0065374 A1 | 3/2016 | Sauerwald et al. | |
| 2016/0196420 A1 | 7/2016 | Chen | |
| 2016/0234214 A1 | 8/2016 | Sethi et al. | |
| 2016/0286587 A1* | 9/2016 | Åstrand ............ G07C 9/00309 | |
| 2017/0026182 A1 | 1/2017 | Sauerwald et al. | |

FOREIGN PATENT DOCUMENTS

| | | |
|---|---|---|
| CN | 101855861 A | 10/2010 |
| CN | 102184352 A | 9/2011 |
| CN | 102497465 A | 6/2012 |
| CN | 102547502 A | 7/2012 |
| CN | 102611956 A | 7/2012 |
| CN | 103155528 A | 6/2013 |
| CN | 103378876 A | 10/2013 |
| CN | 103442120 A | 12/2013 |
| CN | 103442129 A | 12/2013 |
| CN | 103473514 A | 12/2013 |
| CN | 103647587 A | 3/2014 |
| EP | 1870832 A1 | 12/2007 |
| EP | 2387201 A1 | 11/2011 |
| EP | 2535833 A1 | 12/2012 |
| FR | 2882839 A1 | 9/2006 |
| IN | 103748831 A | 4/2014 |
| JP | 2000-163031 A | 6/2000 |
| JP | 2002-342033 A | 11/2002 |
| JP | 2004-157873 A | 6/2004 |
| JP | 2006-311291 A | 11/2006 |
| JP | 2007-535827 A | 12/2007 |
| JP | 2012-108698 A | 6/2012 |
| JP | 2014-123204 A | 7/2014 |
| KR | 10-2009-0054598 A | 6/2009 |
| KR | 101372719 B1 | 3/2014 |

OTHER PUBLICATIONS

Final Office Action received for U.S. Appl. No. 14/810,395, mailed on Mar. 30, 2018, 20 pages.
Final Office Action received for U.S. Appl. No. 14/810,395, mailed on May 5, 2022, 38 pages.
Final Office Action received for U.S. Appl. No. 14/810,395, mailed on May 30, 2019, 35 pages.
Final Office Action received for U.S. Appl. No. 15/286,505, mailed on Aug. 9, 2018, 15 pages.
Final Office Action received for U.S. Appl. No. 15/286,505, mailed on Jul. 23, 2020, 20 pages.
First Action Interview Office Action received for U.S. Appl. No. 14/810,395, mailed on Aug. 16, 2017, 6 pages.
First Action Interview Office Action received for U.S. Appl. No. 15/286,505, mailed on Jan. 22, 2018, 5 pages.
Non-Final Office Action received for U.S. Appl. No. 14/810,395, mailed on Aug. 19, 2021, 32 pages.
Non-Final Office Action received for U.S. Appl. No. 14/810,395, mailed on Mar. 6, 2020, 25 pages.
Non-Final Office Action received for U.S. Appl. No. 14/810,395, mailed on Oct. 1, 2018, 33 pages.
Non-Final Office Action received for U.S. Appl. No. 15/286,505, mailed on Jun. 11, 2021, 24 pages.
Non-Final Office Action received for U.S. Appl. No. 15/286,505, mailed on Oct. 21, 2019, 16 pages.
Notice of Allowance received for U.S. Appl. No. 15/286,505, mailed on Jan. 3, 2022, 9 pages.
Preinterview First Office Action received for U.S. Appl. No. 14/810,395, mailed on Apr. 7, 2017, 4 pages.
Preinterview First Office Action received for U.S. Appl. No. 15/286,505, mailed on Sep. 25, 2017, 4 pages.
Preliminary Search Report received for France Patent Application No. FR1557932, mailed on Jul. 10, 2018, 1 page.

(56) References Cited

OTHER PUBLICATIONS

Search Report received for French Patent Application No. 2009689, mailed on Sep. 20, 2021, 19 pages (9 pages of English Translation and 10 pages of Official Copy).
Search Report received for United Kingdom Patent Application No. GB1515176.4, mailed on Mar. 4, 2016, 2 pages.
Burdis, K. R., "Secure Remote Password SASL Mechanism", draft-burdis-cat-srp-sasl-03, Rhodes University, Available online at: <https://tools.ietf.org/id/draft-burdis-catsrp-sasl-03.txt>, Sep. 12, 2000, 20 pages.
Burdis, K. R., "The Secure Remote Password GSS-API Mechanism (SRPGM)", draft-jetf-cat-srpgm-02, Available online at: <https://tools.ietf.org/html/draft-ietf-cat-srpgm-02>, Jan. 2000, 46 pages.
Carlson, J., "PPP EAP SRP-SHA1 Authentication Protocol", draft-jetf-pppext-eap-srp-00.txt, Sun Microsystems, Available online at: <https://tools.ietf.org/html/draft-ietf-pppext-eap-srp-00>, Dec. 2000, 15 pages.
Lee et al., "A Multi-Touch Three Dimensional Touch-Sensitive Tablet", CHI'85 Proceedings, Apr. 1985, pp. 21-25.
Menezes et al., "Handbook of Applied Cryptography, Chapter 12", Available online at: <URL:http://cacr.uwaterloo.ca/hac/about/chap12.pdf>, Oct. 16, 1996, 54 pages.
Meyer, D., "End-to-End Encryption for the Extensible Messaging and Presence Protocol (XMPP) Using Transport Layer Security (TLS)", draft-meyer-xmpp-e2e-encryption-02, Universitaet Bremen TZI, Available online at: <https://www.ietf.org/archive/id/draft-meyer-xmpp-e2e-encryption-02.txt>, Jun. 29, 2009, 22 pages.
Moller, N., "Using the SRP Protocol as a Key Exchange Method in Secure Shell", draft-nisse-secsh-srp-00, Available online at: <https://tools.ietf.org/html/draft-nisse-secsh-srp-00>, Aug. 3, 2000, 10 pages.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Shah et al., U.S. Appl. No. 61/980,018, filed Apr. 15, 2014, titled "Limiting User Interaction With a Computing Device Based on Proximity of a User".
Stanford, "SRP Documentation", Available online at: <http://srp.stanford.edu/doc.html>, Mar. 30, 2018, 3 pages.
Taylor et al., "Using the Secure Remote Password (SRP) Protocol for TLS Authentication", Available online at: <http://www.ietf.org/rfc/rfc5054.txt>, Nov. 2007, 23 pages.
Varjonen, "HIP and Strong Password Authentication of Users", draft-varjonen-hip-srp-00, Helsinki Institute for Information Technology, Available online at: <https://tools.ietf.org/html/draft-varjonen-hip-srp-00>, Feb. 28, 2009, 17 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Wikipedia, "Station-to-Station Protocol", Available online at: <https://en.wikipedia.org/wiki/Station-to-Station_protocol>, 1987, 4 pages.
Wu, T., "SRP-6: Improvements and Refinements to the Secure Remote Password Protocol", IEEE P1363, Oct. 29, 2002, 5 pages.
Wu, T., "Telnet Authentication: SRP", Stanford University, Available online at: <http://srp.stanford.edu/rfc2944.txt>, Sep. 2000, 7 pages.
Wu, T., "The Secure Remote Password Protocol", Stanford University, Available online at: <http://srp.stanford.edu/ndss.html>, 1998, 24 pages.
Wu, T., "The SRP Authentication and Key Exchange System", Stanford University, Available online at: <http://www.ietf.org/rfc/rfc2945.txt>, Sep. 2000, 8 pages.
Corrected Notice of Allowance received for U.S. Appl. No. 15/286,505, mailed on Apr. 4, 2022, 2 pages.
Research on Energy Saving and Security Protocols in Wireless Sensor Networks, Northeast University Press, Apr. 2013, 7 pages. See attached Communication 37 CFR § 1.98(a)(3).
Search Report received for Chinese Patent Application No. 201910622229.1, mailed on Feb. 23, 2022, 5 pages (2 pages of English Translation and 3 pages of Official Copy).
Search Report received for Chinese Patent Application No. 201910622230.4, mailed on Oct. 8, 2022, 5 pages (2 pages of English Translation and 3 pages of Official Copy).
Teh et al., "NFC Smartphone Based Access Control System Using Information Hiding", IEEE Conference on Open Systems (ICOS), Sarawak, Malaysia, Dec. 2-4, 2013, pp. 13-17.
Wei et al., "Research on Communication Security Technology in Mobile Terminal", Information Technology Series of Full Text Database of Chinese Excellent Master's Thesis, No. 2013-11, Nov. 15, 2013, 8 pages. See attached Communication 37 CFR § 1.98(a)(3).

* cited by examiner

METHOD OF USING ONE DEVICE TO UNLOCK ANOTHER DEVICE

CROSS-REFERENCE TO RELATED APPLICATION

This application is a continuation of U.S. patent application Ser. No. 14/810,395, filed Jul. 27, 2015 and published on Mar. 3, 2016 as U.S. Patent Publication No. US-2016-0065374, which claims the benefit under 35 U.S.C. § 119(e) of U.S. Provisional Patent Application No. 62/044,907, filed Sep. 2, 2014, the content of which is incorporated herein by reference in its entirety for all purposes.

FIELD

This relates generally to a device-unlocking method and system, and more particularly, to unlocking one device using another device.

BACKGROUND

Modern electronic devices such as smartphones and tablet PCs typically have one or more locking/unlocking mechanisms to keep the devices secure. To unlock a device, a user can input a passcode on a login screen of the device or employ a different mechanism such as scanning his fingerprint with a fingerprint scanner. These mechanisms are typically carried out directly on the device being unlocked.

SUMMARY

This generally relates to unlocking one device using another device. As referred to in this document, the device that can unlock another device can be the first device and the device that can be unlocked by another device can be the second device.

In one embodiment, a method of unlocking a second device using a first device is disclosed. For example, a handheld electronic device can unlock a wearable device that has never been unlocked through the exchange of secret keys. The method can include: the first device pairing with the second device; establishing a trusted relationship with the second device; mutually authenticating both devices (i.e., building a trusted relationship between the devices) using a distinct device key in each device (that cannot be removed from the device); receiving a secret key from the second device during setup and storing it; and transmitting the received secret key to the second device to unlock the second device in response to receiving the user input. In other words, the first device can initially contact the second device. The second device can then send the first device a secret and ask the user for the passcode. With this passcode, the second device can derive the master key, validate unlock and store an escrow record. The escrow record contains the master key encrypted by the unlock key as well as the unlock key encrypted by the master key, so that any time the master key changes, the record can be updated.

In another embodiment, a method of a second device being unlocked by a first device is disclosed. For example, one handheld device can unlock another handheld device. The method can include: establishing a trusted relationship with the second device; mutually authenticating both devices using a distinct device key in each device; sending a secret key to the first device during registration; unlocking the second device after receiving a passcode; deriving a master key from the passcode; encrypting the master key with the secret key previously sent to the first device; receiving the secret key from the first device; retrieving the master key using the received secret key; and using the master key to perform an unlocking operation. In other words, the first device can first check in, perform mutual authentication, and exchange a secret with the second device. When the second device is unlocked for the first time (since boot-up), the second device can keep the master key wrapped to the exchanged secret.

In yet another embodiment, a first device capable of unlocking a second device is disclosed. The first device can include: a pairing module configured for pairing with the second device; an authentication module configured for authenticating itself using a device key; a receiving module configured for receiving a secret key from the second device; a user input processing module configured for processing a user input received from an input/output device of the first device; and a transmitting module configured for transmitting the received secret key to the second device to unlock the second device in response to the user input.

In yet another embodiment, a second device capable of being unlocked by a first device is disclosed. The second device can include: a pairing module configured for pairing with the first device; a receiving module configured for receiving a public device key and a secret key from the first device; a key signing module configured for signing the received public device key with a private device key associated with the second device; a transmitting module configured for sending a secret key to the first device; a user input processing module configured for processing a passcode; a deriving module configured for deriving a master key from the passcode; an encrypting module configured for encrypting the master key with the secret key; a retrieving module configured for retrieving the master key using the received secret key; and an unlocking module configured for using the master key to perform an unlocking operation.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This generally relates to unlocking one device using another device. As referred to in this document, the device that can unlock another device can be the first device and the device that can be unlocked by another device can be the second device.

Figure 1:
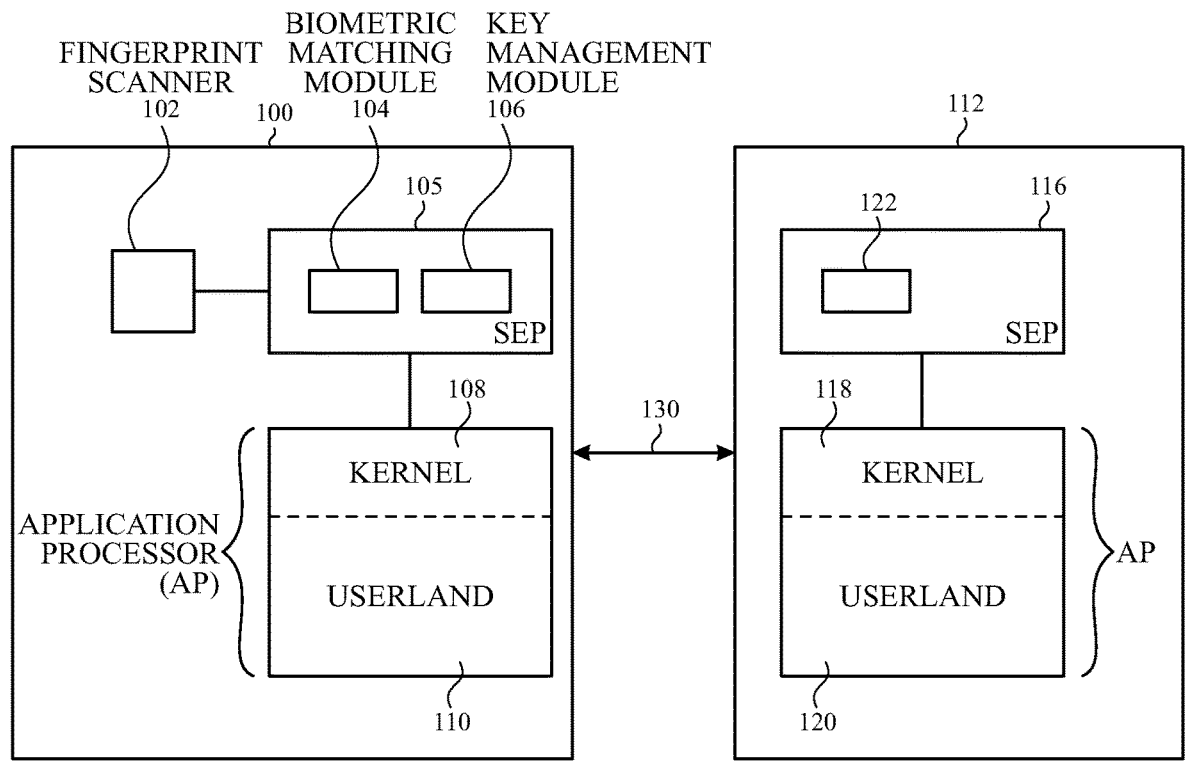
FIG. 1 illustrates a first device and a second device, the first device capable of unlocking the second device, according to an embodiment of the disclosure.

FIG. 1 illustrates a first device 100 and a second device 112. In this embodiment, the first device 100 can be used for unlocking the second device 112. The first device can be, for example, a smartphone, tablet PC, laptop, desktop PC, Mac, electronic reader, smart TV, or game console, or any other devices capable of communicating with another device. The first device 100 can include a secure processor such as a secure enclave processor (SEP) 105 and an application processor that includes a kernel 108 and a user land 110 (also referred to commonly as userspace). The SEP 105 can be a processor separate from the application processor (AP) containing kernel 108 and user land 110. The user land 110 can facilitate the operations of third party applications on the device. The kernel 108 can be the core of the OS and provide a number of interfaces to the user land and manage the input/output (I/O) requests from the applications. In some embodiments, the kernel 108 can also perform key management operations to protect data on the device 100. The SEP 105 can be a relatively small processor that can define a security boundary within which a key management module can reside. The keys can be available when the device is or was previously unlocked. The kernel 108 can communicate with the SEP 105.

In this embodiment, there can be multiple processes within the SEP 105. As illustrated in FIG. 1, the SEP can include a biometric matching module 104 and key management module 106.

The first device 100 can include one or more locking/unlocking mechanisms. One of the mechanisms to unlock the first device can be by entering a passcode on an I/O device such as a touch screen or a physical keypad. Once entered, the passcode can be carried through the user land 110, the kernel 108, to the SEP 105. The SEP can perform a derivation based on the passcode to determine whether the first device 100 can be unlocked and to attempt to unlock its set of user data keys. When the first device is unlocked, the user data keys in the key management module 106 can become available to the device 100.

The first device 100 can also include a fingerprint scanner 102 designed to unlock the device with a user's fingerprint. The fingerprint scanner 102 can capture an image of the fingerprint and send the image to the biometric matching module 104 for processing. After the biometric matching module verifies the captured fingerprint image, it can hand the random key back to the key management module 106, which can prompt the keys in the key management module 106 to be made available to the device 100. The biometric matching module 104 can optionally hold on to the random key in memory after it finishes analyzing the fingerprint.

As illustrated in FIG. 1, the second device 112 can include the same components as the first device. For example, the second device 112 can also include a SEP 116 and an application processor including kernel 118 and user land 120. The SEP 116, kernel 118, and user land 120 can operate in a similar way as their counterparts in the first device 100. Unlike the first device, in this embodiment, the second device may not include a fingerprint scanner. Alternatively, the second device may have a fingerprint scanner. In some embodiments, the second device 112 may not have SEP 116 and biometric matching module, and the key management module 122 can reside in kernel 118.

In one example, the first device can be an iPhone with a fingerprint scanner and the second device can be an iPad, a wearable device, or any other device without a fingerprint scanner.

As described above, the biometric matching module 104 of the first device can receive a secret (e.g., random key) from the key management module 106 when it was unlocked with a passcode and handed it out to the key management module when the first device is unlocked by a fingerprint match. In the embodiments described below, the first device 100 can unlock the second device 112 based on similar principles. In particular, a fingerprint image received by the fingerprint sensor can cause the biometric matching module 104 of the first device 100 to hand out a secret key. Instead of unlocking the first device it can cause key management module 106 to release a secret to key management module 122 on the other device 112. This secret key can be passed through the user land 110 of the first device 100, over a communication channel 130 connecting both key management modules 106, 122 on the two devices 100, 112, and through the user land 120 of the second device 112 to the SEP 116 of the second device 112. The secret key can then be used to unlock the second device 112, as will be described in detail in the embodiments below.

If one of the devices includes a SEP and the other one does not, the device with a SEP may refuse to send its keys to the device without the SEP to avoid a device with weaker protection being able to unlock one with stronger protection. Thus, before information (e.g., one or more keys for remotely unlocking the other device) is transmitted between the devices, the devices can authenticate each other as trusted devices (e.g., a device with a SEP).

First, a common key can be used to validate that a device key (discussed below) associated with each of the first and second devices is owned by a SEP of a trusted device. For example, in one embodiment, the remote unlocking operation can be enabled only between devices having the same type of SEPs (e.g., Apple's SEP). In one embodiment, a common key, e.g., $K_{SEP\ GLOBAL}$, can be derived from a symmetric hardware key shared by the SEPs of the two devices. $K_{SEP\ GLOBAL}$ can then be used for signing one or more other keys that can be used during a remote unlocking process. A key that is signed by the common key, $K_{SEP\ GLOBAL}$, can be deemed to be generated from a device with a SEP, i.e., a device that can be trusted. In another embodiment, a device specific asymmetric key that has been certified by a common authority can be used. Certification can include a classification of the device that can be used to determine its level of protection.

One of the keys that can be validated by $K_{SEP\ GLOBAL}$ can be a device key, $K_d$, which can be unique to each device and used for identifying the device. As referred to hereinafter, $K_{d1}$ can be a key identifying the first device and $K_{d2}$ can be a key identifying the second device. In one embodiment, $K_d$ can be derived from a randomly generated secret for this pairing, a randomly-generated universally unique identifier (UUID) (e.g., KeyBag UUID identifying the current set of User Keys), and a device specific hardware key, e.g., $K_{SEP\ LOCAL}$. $K_{SEP\ LOCAL}$ can be one of the device keys in the key management module of the device that can be used for protecting data associated with the device. The randomly generated secret can be a random value generated by the key store on creation to provide key entropy and uniqueness. The UUID can be for the KeyBag that is being unlocked by the mechanism. The device specific hardware key can be a data protection class key with particular availability (e.g., available at any time, after having been unlocked, or when the device is unlocked). The first device can use an "is-unlocked" device key so it can only authenticate while it is unlocked itself. The second device can use a "been-unlocked" device key, which can require it to having been unlocked once before it can be remotely unlocked. During the unlocking process, $K_{d1}$ and $K_{d2}$ can authenticate the first and second devices, respectively. In some embodiments, $K_{d1}$ and $K_{d2}$ can be used for the first device to unlock the second device when the second device has never been unlocked previously.

In the embodiments where the second device has been unlocked previously, a device unlock key, $_{du}$, can be used not only for authenticating the device, but also for identifying whether a device has been unlocked by a user before. $K_{du}$ can be generated in the SEP of the corresponding device and protected using a passcode associated with the device. As referred to hereinafter, $K_{du1}$ can be a device unlock key associated with the first device and $K_{du2}$ can be a device unlock key associated with the second device. In one embodiment, $K_{du}$ can be derived only if the device has been unlocked before, which can imply that it had been accessed by someone with the correct passcode. If the device is lost, a new user likely would not have the passcode to unlock the device. If the new user attempts to restore the device to its original state by erasing all the data on the device, $K_{du}$ can be lost. Without $K_{du}$, the device would no longer be able to prove to another device that it is still under the control of the same user. In other words, $K_{du}$ can be used for proving not only that the device is a trusted device, but also that it is still under the same user's control. As such, the first device can rely on the presence of $K_{du2}$ to make sure that it does not accidentally unlock the second device when the second device is no longer in the possession of the user and has been rebooted.

FIGS. 2-5 illustrate exemplary algorithm steps in the various stages of a remote unlocking method, according to embodiments of the disclosure. Although the embodiments below describe a one-direction unlocking process (e.g., using the first device to unlock the second device), it should be understood that the disclosed systems and methods can be easily modified to perform unlocking in both directions (e.g., also using the second device to unlock the first device), without departing from the spirit of the disclosure.

Figure 2:
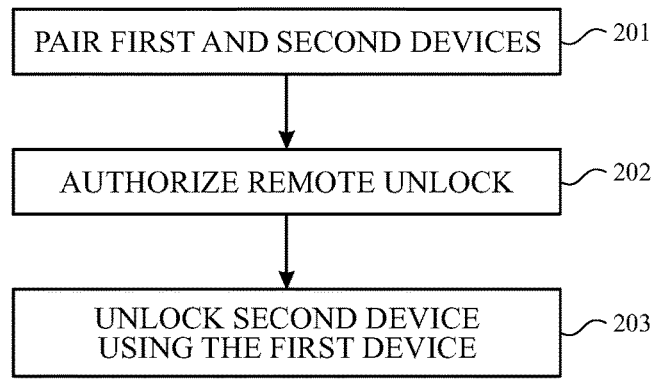
FIG. 2 is a flowchart illustrating the exemplary steps in a method of using a first device to unlock a second device, according to an embodiment of the disclosure.

In the embodiment illustrated in FIG. 2, the algorithm for the remote unlocking process (e.g., using the first device to unlock the second device) can include three main steps. First, the first device and the second device can be paired (step 201). Next the second device can authorize remote unlocking by the first device (step 202). Finally, the first device can unlock the second device in response to a user input on the first device (step 203). Each of these steps is discussed in more detail below.

In the first step, the two devices can be paired (step 201). The devices can be paired using any suitable pairing mechanisms such as Bluetooth when the devices are in close proximity of each other. In one embodiment, the Bluetooth pairing can be a secure pairing using a Bluetooth out-of-band key. For example, the devices can be paired by using a camera on one of the devices to capture a computer-readable code (e.g., a QR code or bar code) displayed on the display of the other device. This code can include information such as a device ID and other information (e.g., a Bluetooth out-of-band key) needed to pair the two devices. Although close proximity pairing is discussed in these embodiments, it should be understood that pairing the two devices does not necessarily require that the devices to be in close proximity. Indeed, any pairing mechanism designed to pair devices at any distance can be used in this step.

After being paired, the devices can go through a registration process that can establish a trusted relationship between the two devices so that one of the devices can be securely unlocked by the other device. In other words, remote unlocking between the devices can be authorized (step 202). In particular, registration can involve pairing the controllers (e.g., SEPs) of the keys of the two devices and also potentially binding the SEPs of the two devices. This step can involve, for example, the devices exchanging and cross-signing their public keys that can be used when authenticating during the registration process, setting up a shared key, and during the unlocking process when this shared key is used. In some examples, pairing can be performed on both devices symmetrically.

Figure 3:
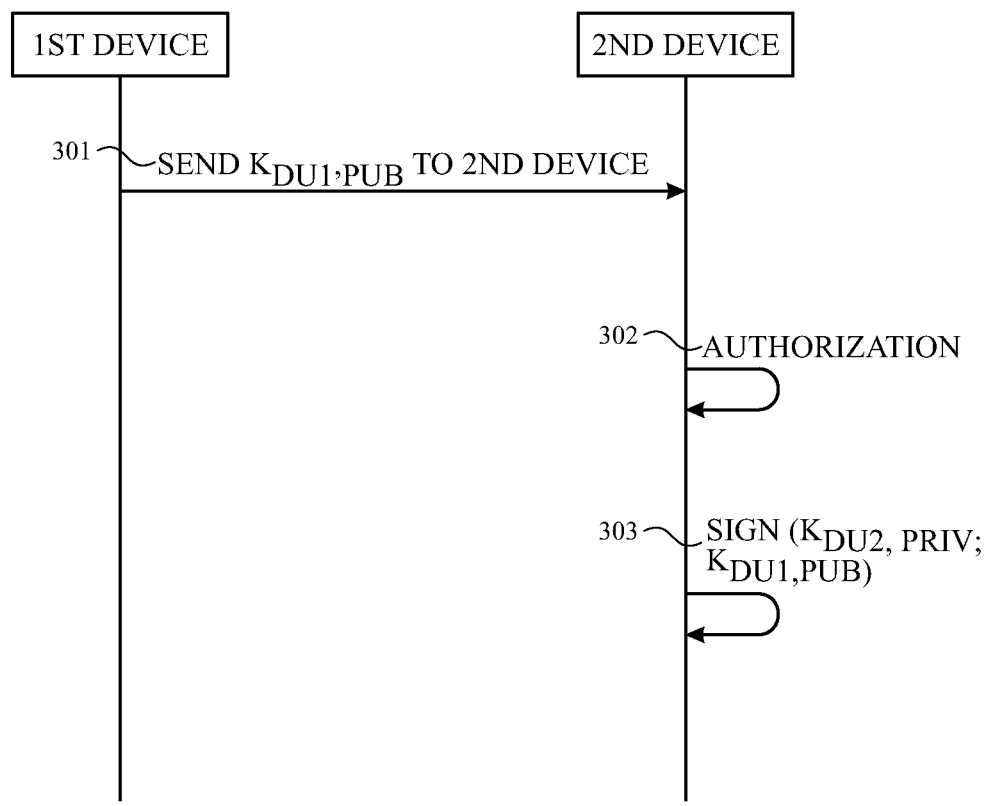
FIG. 3 is a flowchart illustrating the exemplary steps in a registration process, according to an embodiment of the disclosure.
Figure 4:
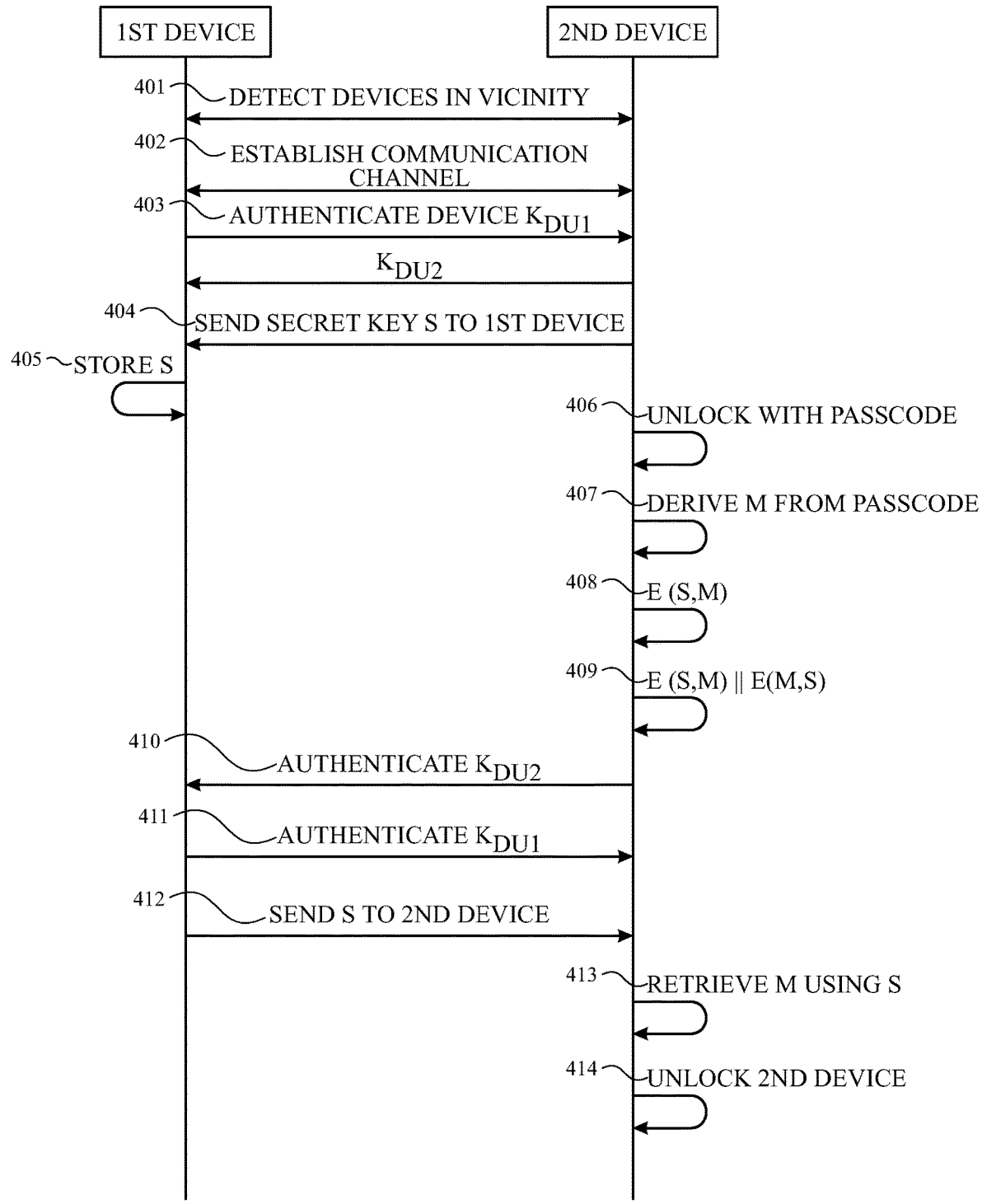
FIG. 4 is a flowchart illustrating the exemplary steps in a method of using a first device to unlock a second device, according to an embodiment of the disclosure.

FIG. 3 is a flow chart illustrating the exemplary algorithm steps in the registration step 202 of FIG. 2. First, the first device (i.e., the device performing the unlocking) can send a public key, e.g., $K_{du1,\ pub}$, to the second device (i.e., the device to be unlocked) (step 301). This public key can be used to validate that the first device is a trusted device when the first device attempts to unlock the second device. The second device can also perform an authorization, which can include receiving a passcode from the user and optionally an out-of-band verification when the user unlocks the second device locally (step 302). Because the passcode protects $K_{du2}$, it can be used to prove that the device is in the possession of the user. The second device can then sign the public key, $K_{du1,\ pub}$, with its private key, $K_{du2,\ private}$ (step 303). As a result, the second device can determine that a device using $K_{du1,\ pub}$ to authenticate during an unlocking operation can be a trusted device. If the registration is successful, the first device can be used to unlock the second device as follows. FIG. 4 illustrates the exemplary algorithm steps in using the first device to unlock the second device (i.e., step 203 of FIG. 2), according to an embodiment of the disclosure. In some examples, the first device can be a handheld device and the second device can be a wearable device. First, the two devices can detect that they are in the vicinity of each other (step 401). In some embodiments, this step can only require that the devices to be able to locate each other without requiring them to be close to each other. A communication channel such as a Bluetooth or Wi-Fi channel can be established between the two devices (step 402). The first device can be authenticated using $K_{du1}$ (step 403). Additionally or alternatively, the second device can be authenticated using $K_{du2}$. The station-to-station protocol can be used for setting up a mutually authenticated and encrypted tunnel. In one embodiment, both devices can use ephemeral encryption keys, which in the process are authenticated using the signing keys exchanged during pairing. Because the first device has been authenticated, the second device can send a random secret key, S, to the first device using, for example, the negotiated session key derived from the ephemeral encryption keys used by both devices (step 404). The first device can store the secret key (step 405). At a later time, the second device can be unlocked with a passcode (step 406). A master key, M, can be derived from the passcode by the second device (step 407). The second device can build a token by encrypting the master key M with the secret key S (step 408) so that when the first device returns the secret key S to the second device, the second device can use S to decrypt the token to retrieve the master key M. Additionally, the second device can concatenate the token with a secret key S encrypted using the master key M, and store this concatenation as an escrow record (step 409). This can allow the second device to recover the secret key S when the master key M changes and build a new token. In an alternative embodiment, the second device can produce an escrow record for the first device using the secret key S stored the master key M wrapped to the secret key S, which can allow the device to be unlocked without having been unlocked before. In other words, in the first embodiment, a fixed secret and escrow record can be established during setup, and in an alternative embodiment, a random secret and a temporary escrow record can be established in response to a device unlock during registration.

Referring to FIG. 4 again, when the user decides to unlock the second device with the first device, the second device can be authenticated using $K_{du2}$ (step 410). The first device can be authenticated with $K_{du1}$ (step 411). Once authenticated, the devices can exchange secrets with one another. For example, the first device can send the secret key S that it received from the second device back to the second device (step 412). This can be in response to the user scanning his fingerprint using the fingerprint scanner of the first device. The second device can retrieve the master key M by decrypting the token with the secret key S (step 413). The master key M can allow the second device to be unlocked (step 414).

In some embodiments where the second device has never been unlocked before, $K_{d2}$ can be used in place of $K_{du2}$ in the method described above in view of FIG. 4. In one embodiment, the second device can produce an escrow record for the first device using the secret key S stored the master key M wrapped to the secret key S, which can allow the device to be unlocked without having been unlocked before. When the first device attempts to unlock the second device, the second device can use the device key to locate the escrow record and the secret key S to unwrap the master key M, which can be used to unlock the second device.

Figure 5:
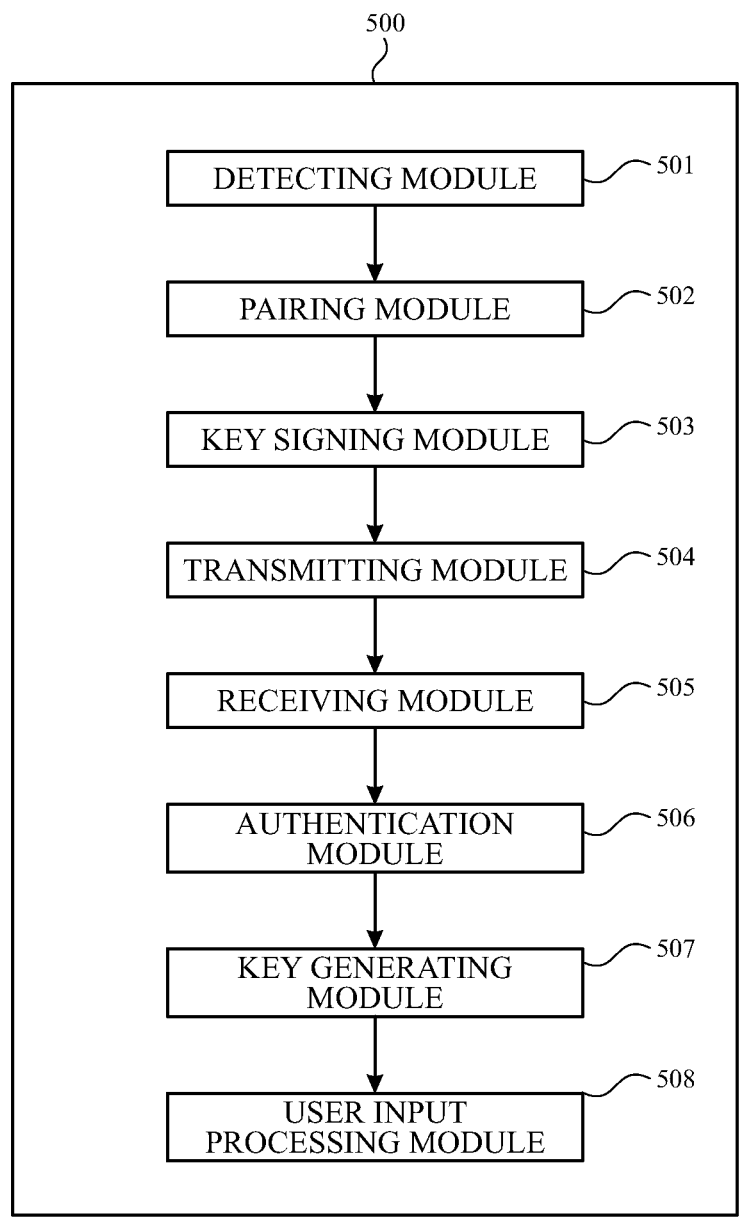
FIG. 5 is a block diagram illustrating the exemplary modules of a device such as the first device or second device of FIG. 1, according to an embodiment of the disclosure.

FIG. 5 is a block diagram illustrating the exemplary modules of a device 500 such as the first device 100 or the second device 112 of FIG. 1 that is capable of either unlocking another device or being unlocked by another device or both. The device 500 can include, for example, a detecting module 501, a pairing module 502, a key signing module 503, a transmitting module 504, a receiving module 505, an authentication module 506, a key generating module 507, and a user input processing module 508. The detecting module 501 can detect the second device (e.g., when the second device is in its vicinity). The pairing module 502 can pair the first device with the second device. The key signing module 503 can sign one or more keys with another key. The transmitting module 504 can transmit one or more keys (e.g., $K_{du1}$, S) to another device. The receiving module 505 can receive one or more keys (e.g., S) from another device. The authentication module 506 can authenticate the device 500. The key generating module 507 can include a deriving module, and can derive a master key from a passcode and generate one or more hardware keys (e.g., $K_{SEP\ GLOBAL}$) that can be used in the unlocking process. The user input processing module 508 can process user input, including but not limited to, passcodes and/or fingerprints.

In various embodiments, some of the modules of FIG. 5 can be optional and additional modules can be included in the device 500. Each of the modules can be implemented in either software, hardware or both. In some embodiments, the modules of device 500 are software modules for performing the algorithms disclosed herein. In some embodiments, the modules of device 500 represent one or more processors coupled to memory storing computer-readable instructions for performing the algorithms disclosed herein. In some embodiments, the modules of device 500 comprise hardware and software elements of an ASIC, such as a system-on-a-chip, for performing the functions described above.

Figure 6:
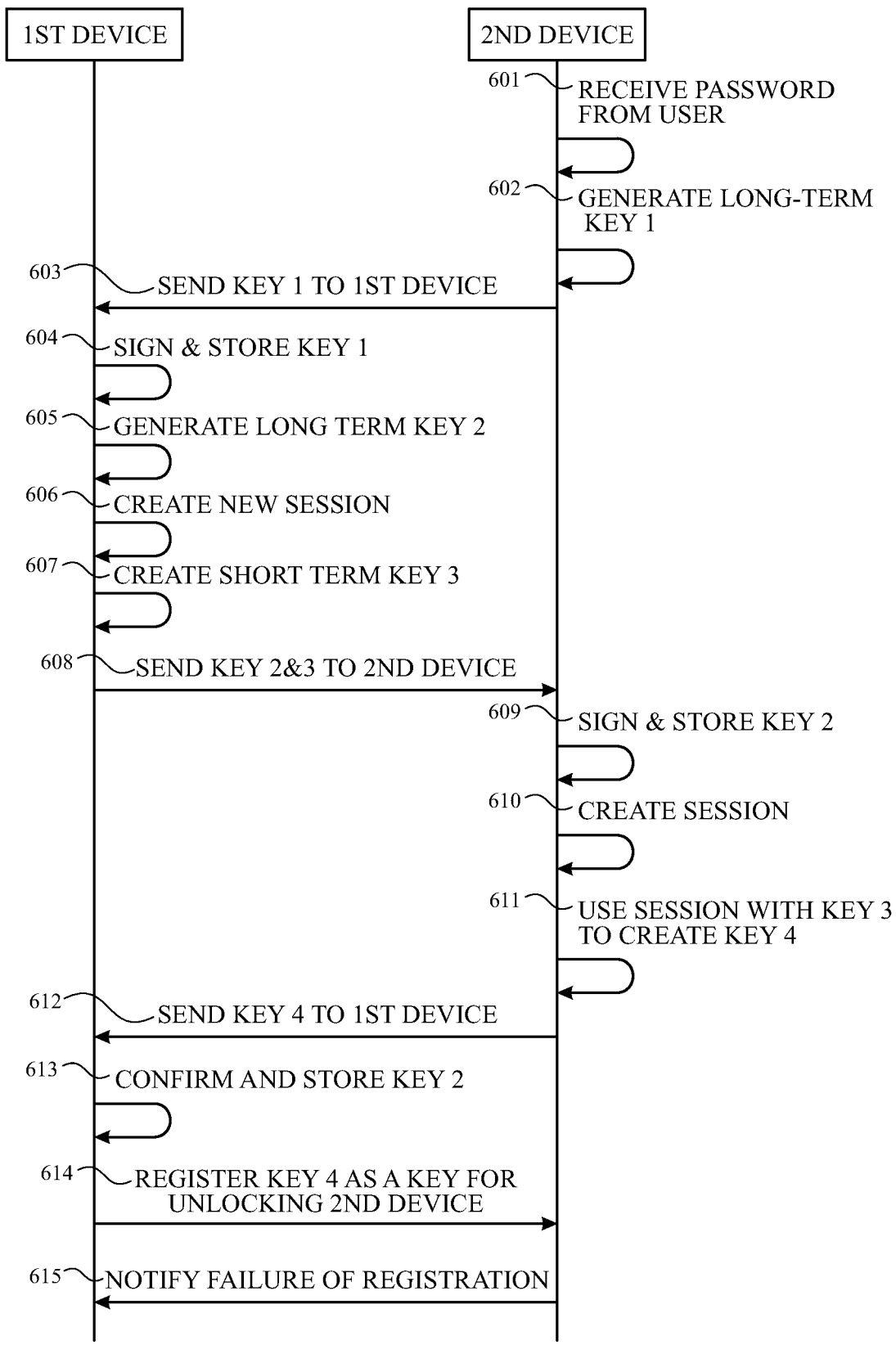
FIG. 6 illustrates the exemplary steps in the pairing of the two devices, according to an embodiment of the disclosure.
Figure 7:
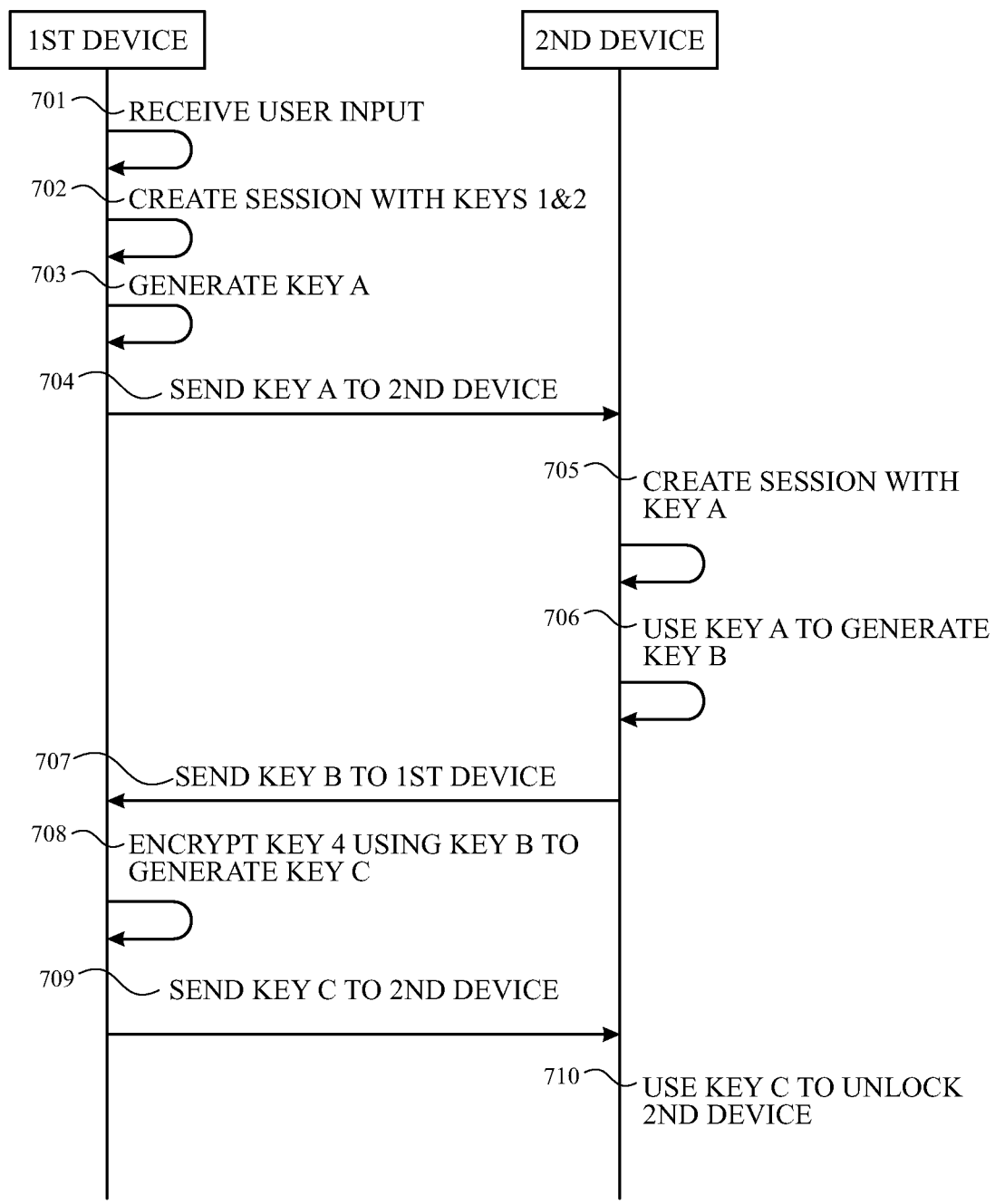
FIG. 7 illustrates the exemplary steps in a method of using the first device to unlock the second device, according to an embodiment of the disclosure.

FIGS. 6 and 7 illustrate an embodiment of a transport protocol algorithm that can facilitate the exchanging of keys (or records) in the remote unlocking of the second device by the first device, as described in the above embodiments.

FIG. 6 illustrate the exemplary algorithm steps in the pairing of the two devices. This pairing process can take place after a communication channel has already been established between the two devices. As illustrated in FIG. 6, to pair the two devices, first, the second device can receive a password entered by a user (step 601). The password can be used for later use. The second device can generate a long term key, Key 1 (step 602). In one embodiment, generating a long term key can refer to creating a key pair of which one can be sent to another device. Here, Key 1 (i.e., one of keys in the key pair, Key 1) can then be sent via the communication channel to the first device (step 603). The first device can sign and store Key 1 (step 604). The first device can then generate its own long term key, Key 2 (step 605). A session can then be created on the first device using the signed Key 1 received from the second device and the newly-generated short term Key 2 (step 606). The long term keys, Key 1 and Key 2, can be kept to create other sessions in the future. Another short term key, Key 3, can be created when the session is created (step 607). Keys 2 and 3 can then be sent across the communication channel to the second device (step 608).

Referring now to FIG. 6, after receiving Key 2 and Key 3, the second device can sign and store Key 2 (step 609). The second device can then create a session at its end using both Key 2 and Key 3 (step 610). With the session created, the second device can generate Key 4 using Key 3 received from the first device (step 611). Key 4 can then be sent across the communication channel to the first device (step 612). After the first device confirms and stores Key 4 (step 613), Key 4 can be registered as a key for unlocking the second device (step 614). If the registration fails, a message can be sent back to the first device, which can cause the first device to delete Key 4 (step 615). Otherwise, the pairing of the devices is successful and the devices are set up to perform a remote unlock operation (e.g., using the first device to unlock the second device).

FIG. 7 illustrates the exemplary algorithm steps in a method of using the first device to unlock the second device. As illustrated in FIG. 7, first, the first device can receive a user input to unlock the second device (step 701). In response, the first device can create a session using long term Keys 1 and 2 (step 702). Another short term key, Key A can be generated from the newly-created session (step 703). The first device can then send Key A across the communication channel to the second device (step 704). In this embodiment, steps 703 and 704 can be to set up a short term key agreement between the first and second devices so that Key 4 can be sent across later to unlock the second device. Because the short term key (e.g., Key A) is unique for each session and only used once for encrypting Key 4, the short term key exchange can prevent a replay attack in which Key 4 is captured when transmitted across the communication channel and then resent from a device other than the first device to the second device to unlock the second device.

The short term key A is then sent to the second device (step 704) to create a session on the second device (step 705). The second device can then use Key A to create another key, Key B (step 706). Referring to FIG. 7, Key B can be sent back to the first device (step 707). The first device can use Key B to encrypt Key 4 to generate a new key, Key C (step 708). The encrypted Key 4 (i.e., Key C) can be sent to the second device (step 709) and used for unlocking the second device (step 710). The unlocking process can involve decrypting Key C to retrieve Key 4 and using Key 4 to unlock the second device.

Figure 8:
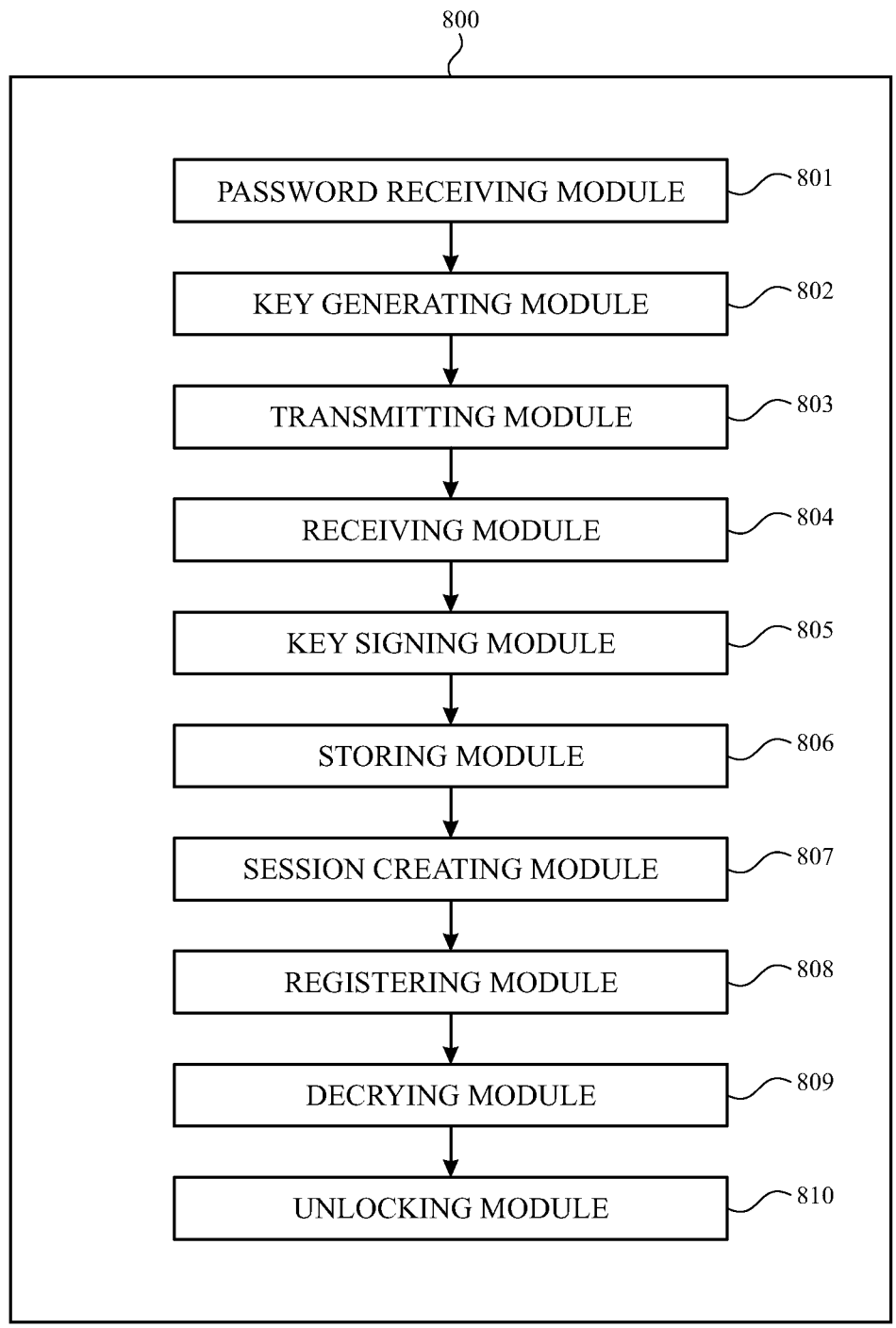
FIG. 8 is a block diagram illustrating the exemplary modules of a second device that can be remotely unlocked by another device, according to an embodiment of the disclosure.

FIG. 8 is a block diagram illustrating the exemplary modules of the second device 800 of FIGS. 6 and 7 that can be remotely unlocked by another device (e.g., the first device). The second device 800 can include, for example, a password receiving module 801, a key generating module 802, a transmitting module 803, a receiving module 804, a key signing module 805, a storing module 806, a session creating module 807, a registering module 808, a decrypting module 809, and an unlocking module 810. The password receiving module 801 can receive a password (or other input) from a user. The key generating module 802 can generate long term and/or short term keys (e.g., Keys 1, 4, and B of FIGS. 6 and 7). The transmitting module 803 can transmit one or more encrypted or unencrypted keys to another device (e.g., the first device). The receiving module 804 can receive one or more encrypted or unencrypted keys from another device (e.g., the first device). The key signing module 805 can sign a key (e.g., Key 2) received from another device. The storing module 806 can store keys generated locally or received from another device. The session creating module 807 can create a session using a key (e.g., Key 2 and Key A) received from another device. The registering module 808 can register a key (e.g., Key 4) as a key for unlocking the second device. The decrypting module 809 can decrypt any decrypted key (e.g., Key C) received from another device. The unlocking module 810 can unlock the second device using a key (e.g., Key 4 obtained by decrypting Key C).

Figure 9:
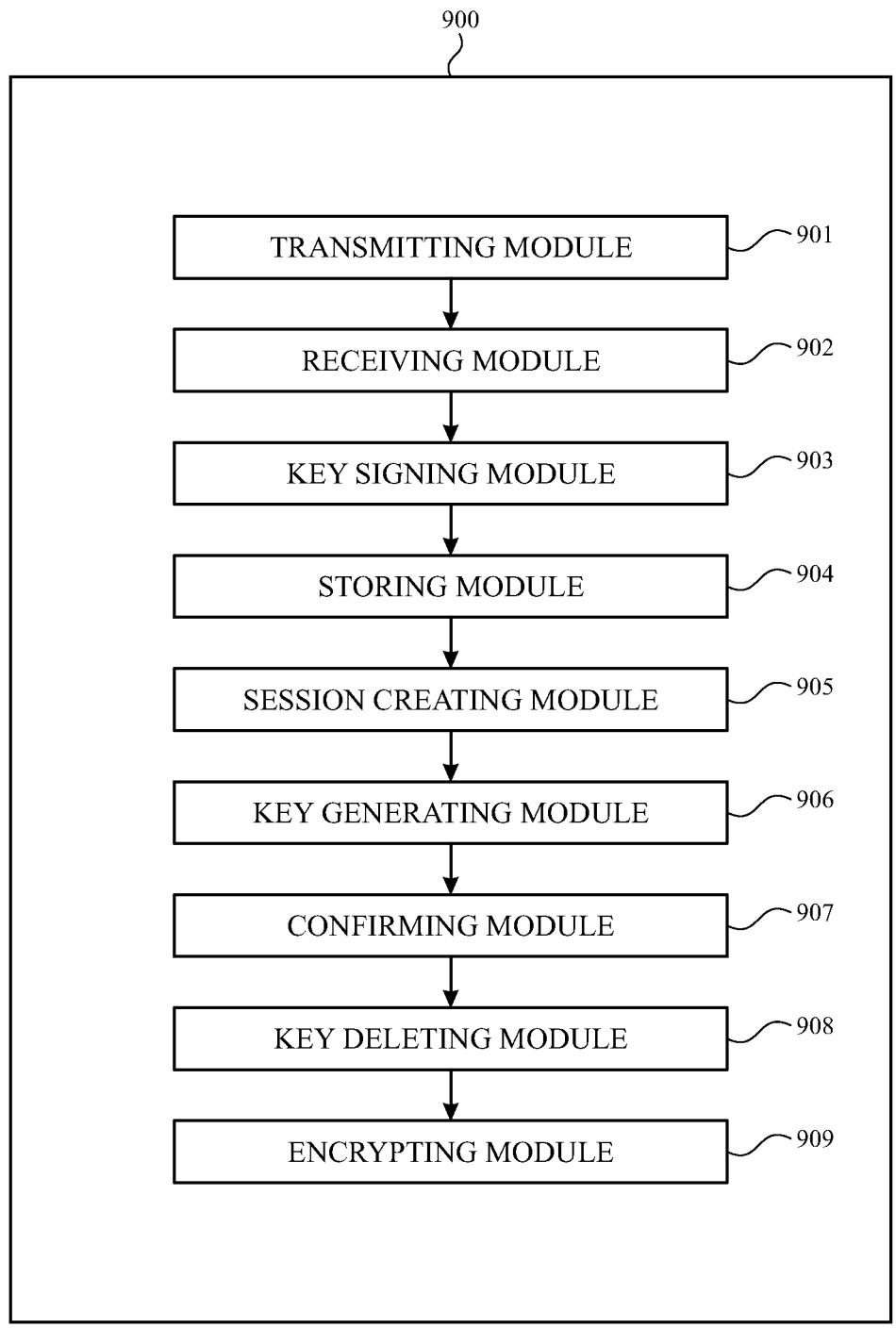
FIG. 9 is a block diagram illustrating the exemplary modules of a first device that can perform a remote unlocking of another device, according to an embodiment of the disclosure.

FIG. 9 is a block diagram illustrating the exemplary modules of the first device 900 of FIGS. 6 and 7 that can perform a remote unlocking of another device (e.g., the second device). The first device 900 can include, for example, a transmitting module 901, a receiving module 902, a key signing module 903, a storing module 904, a session creating module 905, a key generating module 906, a confirming module 907, a key deleting module 908, and an encrypting module 909. The transmitting module 901 can transmit one or more keys (e.g., Keys 2, 3, A, C) to another device (e.g., the second device of FIGS. 6 and 7). The receiving module 902 can receive one or more keys (e.g., Keys 1, 4, B) from another device (e.g., the second device). The key signing module 903 can sign a key (e.g., Key 1) received from another device. The storing module 904 can store one or more keys generated locally or received from another device. The session creating module 905 can create a session using one or more keys (e.g., Keys 1 and 2). The key generating module 906 can generate one or more long term and/or short term keys (e.g., Keys 2, 3, A, C). The confirming module 907 can confirm a key (e.g., Key 4) as a key for unlocking another device. The key deleting module 908 can delete a key from the device. The encrypting module 909 can encrypt a key (e.g., Key 4) using another key (e.g., Key B) to generate an encrypted key (e.g., Key C).

In various embodiments, some of the modules of FIGS. 8 and 9 can be optional and additional modules can be included in the devices 800 and 900. Each of the modules can be implemented in either software, hardware or both. In some embodiments, the modules of device 800 and 900 are software modules for performing the algorithms disclosed herein. In some embodiments, the modules of device 800 and 900 represent one or more processors coupled to memory storing computer-readable instructions for performing the algorithms disclosed herein. In some embodiments, the modules of device 800 and 900 comprise hardware and software elements of an ASIC, such as a system-on-a-chip, for performing the functions described above.

In some embodiments, one or more of the modules of the devices 500, 800, and 900 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 10:
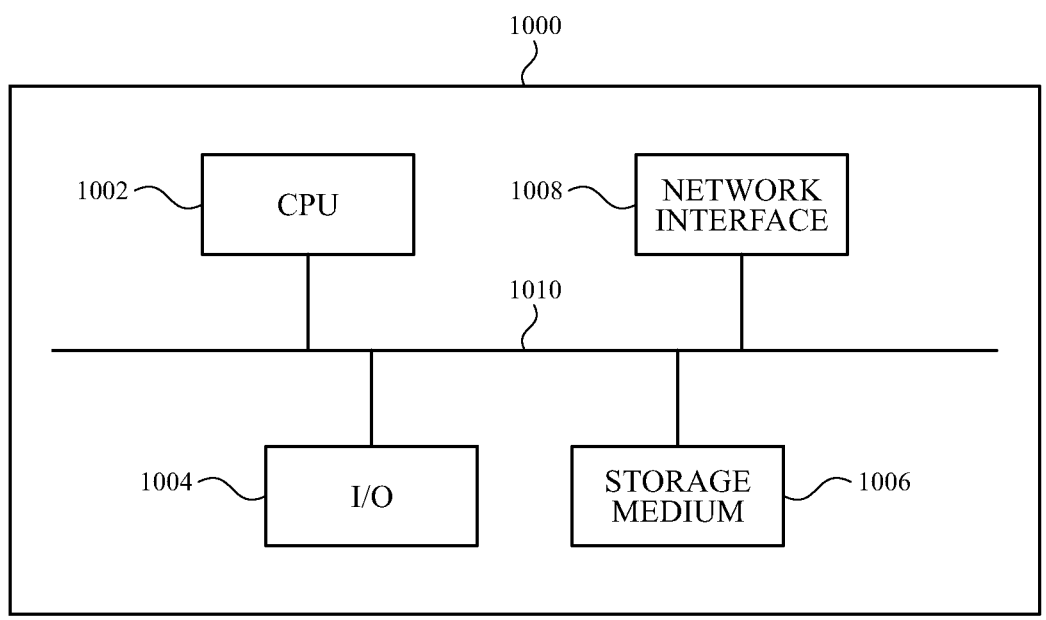
FIG. 10 illustrates exemplary components of a computing system such as the first device or second device described in the embodiments of the disclosure.

The non-transitory computer readable storage medium can be part of a computing system serving as the first device or the second device. FIG. 10 illustrates exemplary common components of one such computing system. As illustrated, the system 1000 can include a central processing unit (CPU) 1002, I/O components 1004 including, but not limited to one or more of display, keypad, touch screen, speaker, and microphone, storage medium 1006 such as the ones listed in the last paragraph, and network interface 1008, all of which can be connected to each other via a system bus 1010. The storage medium 1006 can include the modules of FIGS. 5, 8, and 9.

Therefore, according to the above, some examples of the disclosure are directed to a method of unlocking a second device from a first device, comprising: establishing a trusted relationship with the second device; authenticating the first device using a device key; receiving a secret key from the second device; receiving user input from an input/output device; and transmitting the received secret key to the second device to unlock the second device in response to receiving the user input, wherein establishing the trusted relationship with the second device comprises using a key generated from a hardware key associated with the first device to authenticate the device key. Additionally or alternatively to one or more of the examples disclosed above, in some examples prior to establishing the trusted relationship with the first device, the method further comprises pairing the first device with the second device by displaying a code on a display to be captured by the second device. Additionally or alternatively to one or more of the examples disclosed above, in some examples pairing with the second device is done with a Bluetooth out-of-band key. Additionally or alternatively to one or more of the examples disclosed above, in some examples establishing the trusted relationship with the second device comprises sending a public key to the second device. Additionally or alternatively to one or more of the examples disclosed above, in some examples the public key comprises a device key generated from an instance secret, a UUID identifying a set of keys, and a private device hardware key. Additionally or alternatively to one or more of the examples disclosed above, in some examples the method further comprises validating the public key using a key generated from a hardware key associated with the first device. Additionally or alternatively to one or more of the examples disclosed above, in some examples the hardware key is shared with the second device. Additionally or alternatively to one or more of the examples disclosed above, in some examples the public key is certified by a shared authority. Additionally or alternatively to one or more of the examples disclosed above, in some examples the method further comprises authenticating the second device using a device key associated with the second device. Additionally or alternatively to one or more of the examples disclosed above, in some examples the device key associated with the second device is configured to indicate whether the second device has been unlocked before.

Some examples of the disclosure are directed to a method performed at a second device for being unlocked by a first device, comprising: receiving a public device key from the first device; signing the received public device key with a private device key associated with the second device; sending a secret key to the first device; receiving a passcode; deriving a master key from the passcode; encrypting the master key with the secret key; receiving the secret key from the first device; retrieving the master key using the received secret key; and using the master key to perform an unlocking operation. Additionally or alternatively to one or more of the examples disclosed above, in some examples the method further comprises authenticating the first device using a device ID associated with the first device. Additionally or alternatively to one or more of the examples disclosed above, in some examples the method further comprises unlocking the second device using the passcode. Additionally or alternatively to one or more of the examples disclosed above, in some examples the secret key comprises a random key. Additionally or alternatively to one or more of the examples disclosed above, in some examples the private device key is configured to indicate whether the second device has been unlocked with a passcode before.

Some examples of the disclosure are directed to a non-transitory computer-readable storage medium of a first device capable of unlocking a second device, the storage medium storing instructions which, when executed by a processor, perform a method comprising: authenticating the first device using a device key; receiving a secret key from the second device; processing a user input received from an input/output device of the first device; and transmitting the received secret key to the second device to unlock the second device in response to the user input. Additionally or alternatively to one or more of the examples disclosed above, in some examples the method further comprises detecting whether the second device is within a Bluetooth range of the first device. Additionally or alternatively to one or more of the examples disclosed above, in some examples the method further comprises signing a first key with a second key. Additionally or alternatively to one or more of the examples disclosed above, in some examples the first key comprises a device key and the second key comprises a SEP global key. Additionally or alternatively to one or more of the examples disclosed above, in some examples the method further comprises generating at least one of: a SEP global key, a device key, and a device unlock key.

Some examples of the disclosure are directed to a non-transitory computer-readable storage medium of a second device capable of being unlocked by a first device, the storage medium storing instructions, which, when executed by a processor, perform a method comprising: receiving a public device key and a secret key from the first device; signing the received public device key with a private device key associated with the second device; sending a secret key to the first device; processing a passcode; deriving a master key from the passcode; encrypting the master key with the secret key; retrieving the master key using the received secret key; and using the master key to perform an unlocking operation. Additionally or alternatively to one or more of the examples disclosed above, in some examples the method further comprises authenticating the first device using a device ID associated with the first device. Additionally or alternatively to one or more of the examples disclosed above, in some examples the method further comprises unlocking the second device using the passcode.

Some examples of the disclosure are directed to a first device capable of unlocking a second device, the first device comprising: an authentication module configured for establishing a trusted relationship with the second device and authenticating the first device using a device key; a receiving module configured for receiving a secret key from the second device; a user input processing module configured for processing user input received from an input/output device; and a transmitting module configured for transmitting the received secret key to the second device to unlock the second device in response to receiving the user input, wherein establishing the trusted relationship with the second device comprises using a key generated from a hardware key associated with the first device to authenticate the device key.

Some examples of the disclosure are directed to a second device capable of being unlocked by a first device, the second device comprising: a receiving module configured for receiving a public device key from the first device; a key signing module configured for signing the received public device key with a private device key associated with the second device; a transmitting module configured for sending a secret key to the first device; a user input processing module configured for processing a passcode; a deriving module configured for deriving a master key from the passcode; an encrypting module configured for encrypting the master key with the secret key; a receiving module for receiving the secret key from the first device and retrieving the master key using the received secret key; and an unlocking module configured for using the master key to perform an unlocking operation.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method for unlocking a second device with a first device, the method comprising:
   during a first communication session, establishing a trusted relationship between the first device and the second device including receiving a first long-term key;
   during a second communication session, different from the first communication session:
      generating, at the first device, a short-term key, wherein the short-term key is generated using the first long-term key;
      transmitting the short-term key to the second device;
      receiving, from the second device, an encrypting key generated by the second device using the short-term key;
      encrypting an unlocking key with the encrypting key; and
      transmitting the encrypted unlocking key to the second device to unlock it,
   wherein establishing the trusted relationship between the first device and the second device includes generating the unlocking key.

2. The method of claim 1, wherein the short-term key is unique for each session.

3. The method of claim 1, wherein the encrypting key is unique for each session.

4. The method of claim 1, wherein establishing the trusted relationship further includes generating a second long-term key at the first device.

5. The method of claim 1, wherein the unlocking key is generated from the first long-term key and a second long-term key.

6. The method of claim 1, wherein the unlocking key is received at the first device from the second device.

7. The method of claim 1, further comprising creating a session using the first long-term key and a second long-term key, wherein the short-term key is generated from the session.

8. The method of claim 1, further comprising, after unlocking the second device, deleting one or more of the short-term key and the encrypting key.

9. A non-transitory computer-readable storage medium of a first device capable of unlocking a second device, the storage medium storing instructions which, when executed by a processor perform a method comprising:
   during a first communication session, establishing a trusted relationship between the first device and the second device including receiving a first long-term key;
   during a second communication session, different from the first communication session:
      generating, at the first device, a short-term key, wherein the short-term key is generated using the first long-term key;
      transmitting the short-term key to the second device;
      receiving, from the second device, an encrypting key generated by the second device using the short-term key;
      encrypting an unlocking key with the encrypting key; and
      transmitting the encrypted unlocking key to the second device to unlock it,
   wherein establishing the trusted relationship between the first device and the second device includes generating the unlocking key.

10. The non-transitory computer-readable storage medium of claim 9, wherein the short-term key is unique for each session.

11. The non-transitory computer-readable storage medium of claim 9, wherein the encrypting key is unique for each session.

12. The non-transitory computer-readable storage medium of claim 9, wherein establishing the trusted relationship further includes generating a second long-term key at the first device.

13. The non-transitory computer-readable storage medium of claim 9, wherein the unlocking key is generated from the first long-term key and a second long-term key.

14. The non-transitory computer-readable storage medium of claim 9, wherein the unlocking key is received at the first device from the second device.

15. The non-transitory computer-readable storage medium of claim 9, the method further comprising creating a session using the first long-term key and a second long-term key, wherein the short-term key is generated from the session.

16. The non-transitory computer-readable storage medium of claim 9, the method further comprising, after unlocking the second device, deleting one or more of the short-term key and the encrypting key.

17. A first device capable of unlocking a second device, the first device comprising:
   one or more processors; and
   memory storing one or more programs including instructions, which when executed by the first device, cause the first device to perform a method comprising:
   during a first communication session, establishing a trusted relationship between the first device and the second device including receiving a first long-term key;
   during a second communication session, different from the first communication session:
      generating, at the first device, a short-term key, wherein the short-term key is generated using the first long-term key;
      transmitting the short-term key to the second device;
      receiving, from the second device, an encrypting key generated by the second device using the short-term key;
      encrypting an unlocking key with the encrypting key; and
      transmitting the encrypted unlocking key to the second device to unlock it,
   wherein establishing the trusted relationship between the first device and the second device includes generating the unlocking key.

* * * * *